(12) United States Patent
Adorni et al.

(10) Patent No.: US 6,241,306 B1
(45) Date of Patent: Jun. 5, 2001

(54) DEVICE FOR SEALED MOUNTING OF A PART ON A FRAME

(75) Inventors: Serge Adorni, Rennes; Yvon Hautbois, Vitre; Yves Orhant, Gennes sur Seiche, all of (FR)

(73) Assignee: The Standard Products Company, Cleveland, OH (US)

( * ) Notice: Subject to any disclaimer, the term of this patent is extended or adjusted under 35 U.S.C. 154(b) by 0 days.

(21) Appl. No.: 09/176,410

(22) Filed: Oct. 20, 1998

(30) Foreign Application Priority Data

Oct. 31, 1997 (FR) .................................................. 97 13724

(51) Int. Cl.[7] .............................. B60J 10/02; E06B 7/22; E06B 7/23
(52) U.S. Cl. ...................... 296/146.15; 296/201; 296/93; 52/204.597; 52/208
(58) Field of Search ................................ 296/146.15, 93, 296/201; 52/204.597, 208

(56) References Cited

U.S. PATENT DOCUMENTS 4,858,988 * 8/1989 Morgan et al. ...................... 296/201
5,553,913 * 9/1996 Nabuurs ................................. 296/216
5,620,794 * 4/1997 Burkart et al. ..................... 296/146.15
5,624,148 * 4/1997 Young et al. ...................... 296/146.15

FOREIGN PATENT DOCUMENTS

| 33 33 672 A1 | 4/1985 | (DE) . |
| 41 41 813 A1 | 6/1993 | (DE) . |
| 195 39 960 A1 | 4/1997 | (DE) . |
| 0 628 453 A1 | 12/1994 | (EP) . |
| 1178894 | 5/1959 | (FR) . |

* cited by examiner

Primary Examiner—D. Glenn Dayoan
Assistant Examiner—Greg Blankenship

(57) ABSTRACT

The invention relates to a device for sealed mounting of a part on a frame, the device being of the type comprising an edging having an elastically deformable body provided firstly with a link element overmolded at least in part on the periphery of the part, and secondly with a sealing element, wherein the sealing element projects from the edging towards the frame and has a removable fixing device designed to co-operate with a complementary retaining device carried by the edging.

5 Claims, 2 Drawing Sheets

DEVICE FOR SEALED MOUNTING OF A PART ON A FRAME

The present invention relates to a device for sealed mounting of a part on a frame, and to the use thereof, in particular for sealed mounting of a window to the bodywork of a motor vehicle.

BACKGROUND OF THE INVENTION

Devices already exist for mounting parts on bodywork or more generally on frames.

Such devices comprise an edging of elastomer material whose body is provided firstly with a link element that is overmolded at least in part on the periphery of the part that is to be mounted, and secondly with an element that provides sealing with the adjacent portions of the frame.

Nevertheless, such devices are not adapted to all mounting situations insofar as the sealing element is of a determined shape and is associated in a non-removable manner to the edging so as to form a one-piece unit.

Under such conditions, it is not possible for the sealing element under all circumstances to ensure sealing contact with the adjacent portions of the frame in an effective and satisfactory manner.

In addition, in the event of the sealing element wearing or becoming damaged, the only solution consists of dismounting the entire part together with its edging and replacing it in full, thereby complicating maintenance operations.

OBJECTS AND SUMMARY OF THE INVENTION

An object of the present invention is to solve those technical problems in a satisfactory manner.

According to the invention, this object is achieved by a device for sealed mounting of a part on a frame, the device being of the type comprising an edging having an elastically deformable body provided firstly with a link element overmolded at least in part on the periphery of said part, and secondly with a sealing element, wherein said sealing element projects from said edging towards the frame and includes removable fixing means designed to co-operate with complementary retaining means carried by said edging.

In a particular embodiment, said removable fixing means are constituted by a protuberance formed on one of the ends of said sealing element and designed to lock by snap-fastening in a groove formed in the edging.

In a variant, said protuberance constitutes a dovetail of substantially circular section.

In another variant, the opening is narrower than the widest portion of the groove.

According to an advantageous characteristic, said sealing element includes at least one lip and/or tubular section which extends laterally relative to said part to come into contact with the adjacent portions of the frame.

According to another characteristic associated with dynamic sealing, said edging also includes a guide element whose profile matches the outlines of the adjacent portions of the frame.

According to yet another characteristic, associated with static sealing, said edging has both an anchor element for anchoring in the frame, and a positioning and wedging element.

According to yet another characteristic, said sealing element possesses a contact zone for contacting the frame, which zone is provided with a surface covering having sliding properties. This characteristic is advantageous in the context of dynamic sealing when the sealing element and the part move together relative to the frame.

In another embodiment, the peripheral edge of the part is held captive in said link element which forms a clamp.

The invention also provides the use of the abovedefined device for sealed mounting of a window to the bodywork of a motor vehicle.

The device of the invention makes it possible for the edging and thus for the part to be docked relative to the frame in a accurate, stable, and sealed manner whatever the constraints associated with the surrounding shapes, and it also improves the appearance of the assembly.

Mounting of the part is thus simplified and facilitated, and can therefore be automated.

It is also possible to provide for the respective sections of the edging, of the sealing elements, and of the guide, positioning, and wedging or anchoring elements to vary around the outline of a given part so as to ensure that the mounting device is a perfect fit.

The device of the invention applies to any type of mounting, both to mounting where sealing is ensured in dynamic manner (sliding windows), and where it is static (windshields, . . . ).

BRIEF DESCRIPTION OF THE DRAWINGS

The invention will be better understood on reading the following description accompanied by drawings, in which.

MORE DETAILED DESCRIPTION

Figure 1:
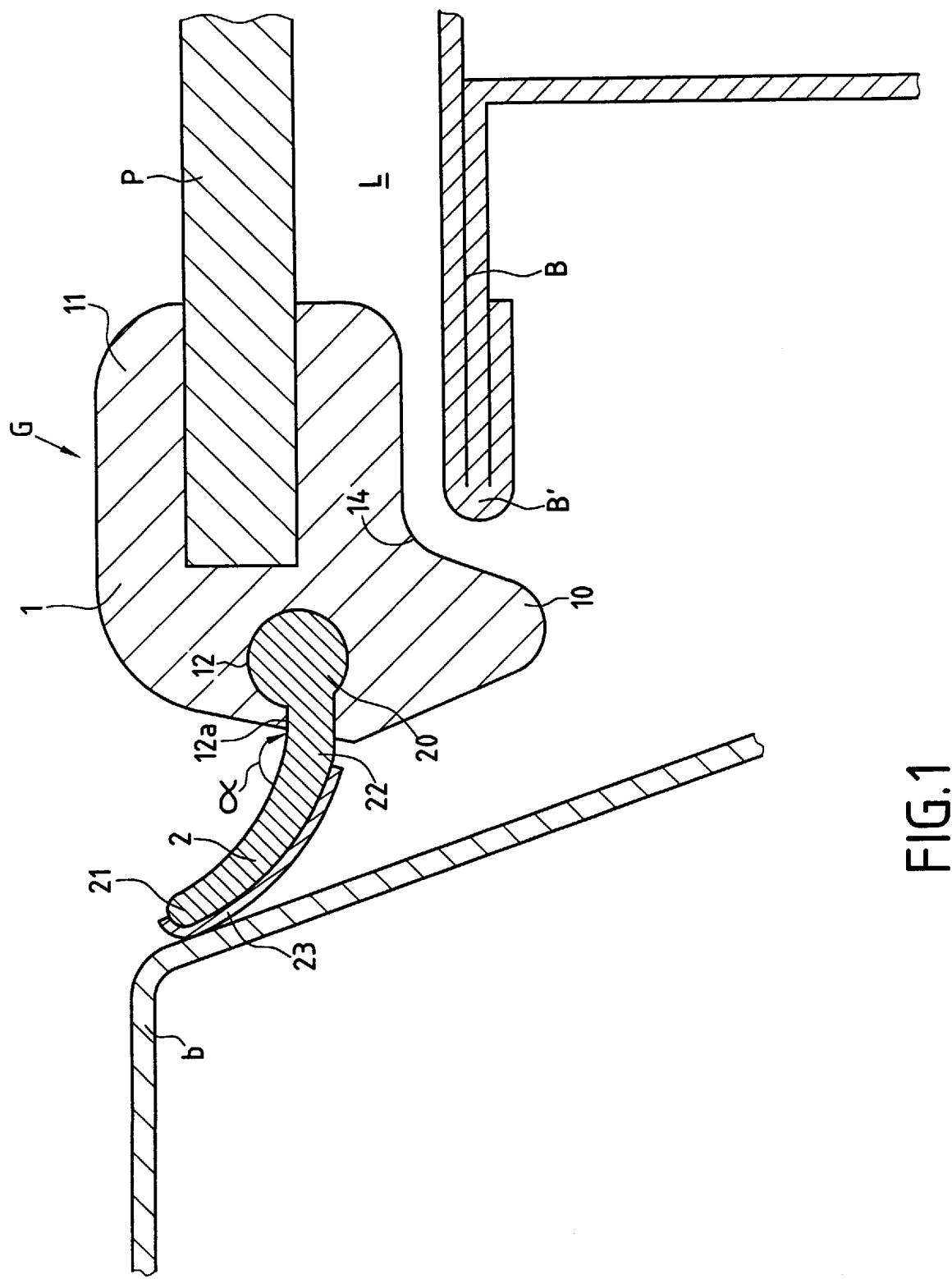
FIG. 1 is a cross-section view of a first embodiment of the device of the invention.

The device shown in FIG. 1 is designed for mounting a plane moving part P (such as a glass panel or sliding window) to a frame B that is formed, for example, by a metal structure or by a portion of the bodywork of a motor vehicle in which an opening L is formed.

The device comprises an edging G whose elastically deformable body 1 is provided firstly with a link element or clamping-forming element 11 that connects it to the panel P, and secondly with an sealing element 2 that provides dynamic sealing for the opening L that is to be closed by said panel, by coming into contact with the adjacent portions of the frame B.

The link element 11 is overmolded at least in part on the periphery of the panel P, for example by means of an encapsulation method. The peripheral edge of the panel P is thus held captive in the clamp-forming link element 11.

The sealing element 2 projects from the body 1 of the edging G towards the frame, and more precisely towards the flank b that defines the opening L laterally.

The sealing element 2 has removable fixing means designed to co-operate with complementary retaining means carried by the edging G.

In the embodiment shown, these fixing means 2 is constituted by a protuberance 20 formed on one of the ends of the sealing element 2.

This protuberance 20 is designed to be locked by snap-fastening in a groove 12 having elastically deformable walls and formed in the body 1 of the edging G.

In a variant, it is the protuberance which deforms elastically in order to lock itself in a cavity having stiffer walls.

The protuberance 20 is preferably a dovetail of substantially circular section while the opening 12a is narrower than the widest portion of the groove 12.

The protuberance 20 is inserted into the groove 12 by applying force and by elastically deforming the opening 12a (or the protuberance itself in the variant mentioned above).

It is possible to provide for the protuberance to be put into place in the groove directly during the encapsulation operation.

The sealing element 2 is constituted by at least one lip 21 which extends laterally relative to the panel P and which is connected to the protuberance 20 by a spacer 22. The lip 21 is preferably made of ethylene-propylene-diene-monomer (EPDM), thermoplastic rubber (TPR), or a thermoplastic material.

In a variant (not shown), sealing is provided or completed by means of a tubular section.

The connection between the lip 21 and the spacer 22 takes place, for example, via a bend of angle α lying in the range 120° to 160°.

The free end of the lip 21 bears dynamically against the inside face of the flank b of the frame B while the panel P is moving along the longitudinal opening L, parallel to said frame.

To this end, the zone of the lip 21 which comes into contact with the flank b is preferably provided with a surface covering 23 having sliding properties (flock, . . . .

Where appropriate, the lip 21 is made so that its hardness varies along its length, such that its zone which is in contact with the frame is flexible while its zone that connects with the spacer is rigid.

The edging G also includes a guide element 10 for guiding the moving panel P relative to the frame B.

To this end, the profile of the element 10 matches the outlines of the portions of the frame B that define the back of the opening L.

In the embodiment shown, the guide element 10 is in the form of a projection extending towards the inside of the opening L substantially perpendicularly to the sealing element 2, and defining in the body 1 around its cavity 14 that is designed to receive an edge B' of the frame B, possibly in sliding manner.

Figure 2:
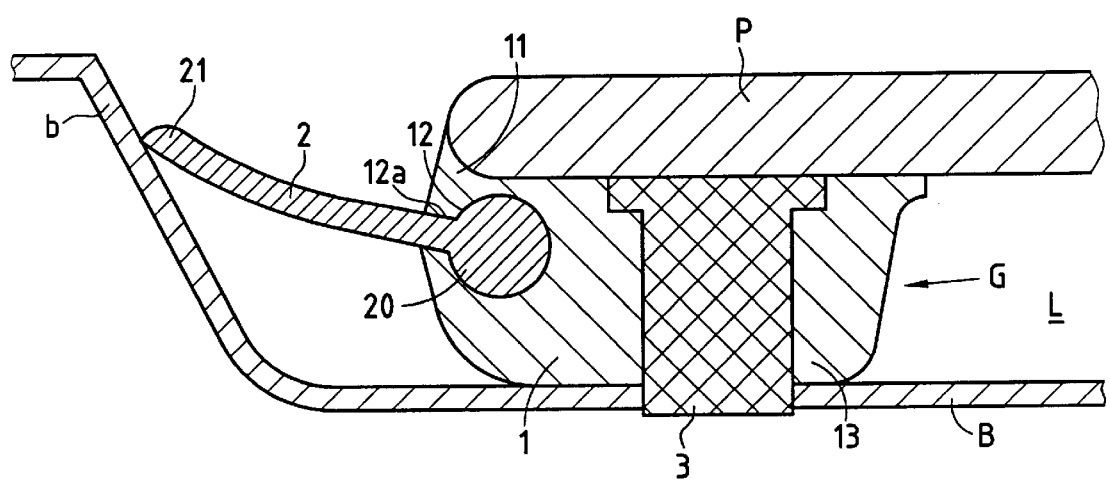
FIG. 2 is a cross-section view of another embodiment.

In the embodiment shown in FIG. 2, the link element 11 is overmolded on the inside face only of the panel P and is therefore not visible from outside the opening L.

The edging is also associated firstly with an anchor element 3 that serves to anchor it (and thus also the panel P) on the frame B at the back of the opening L, and secondly with an element 13 forming a spacer and serving to position and wedge the panel P on assembly.

In this case the sealing element 2 thus provides static sealing of the opening L.

What is claimed is:

1. A device for sealed mounting of a part on a frame, the device comprising an edging having an elastically deformable body provided firstly with a link element overmolded at least in part on a periphery of said part and having both an anchor element for anchoring the frame, and a positioning and wedging element, and secondly with a sealing element, said edging has a guide element whose profile matches outlines of adjacent portions of the frame while said sealing element projects from said edging towards the frame and comprises:

a removable fixing portion designed to co-operate with a complementary retaining portion carried by said edging; and at least one lip extending laterally from said part to come into contact with adjacent portions of the frame.

2. The device according to claim 1 wherein said removable fixing portion is constituted by a protuberance formed on one end of said sealing element and designed to lock by snap-fastening in a groove formed in said edging.

3. The device according to claim 2 wherein said protuberance constitutes a dovetail of substantially circular section.

4. The device according to claim 2 wherein an opening is narrower than widest portion of the groove.

5. The use of the device according to claim 4 for sealed mounting of a window in bodywork of a motor vehicle.

* * * * *